_United States Patent Office_ 3,521,392
Patented July 21, 1970

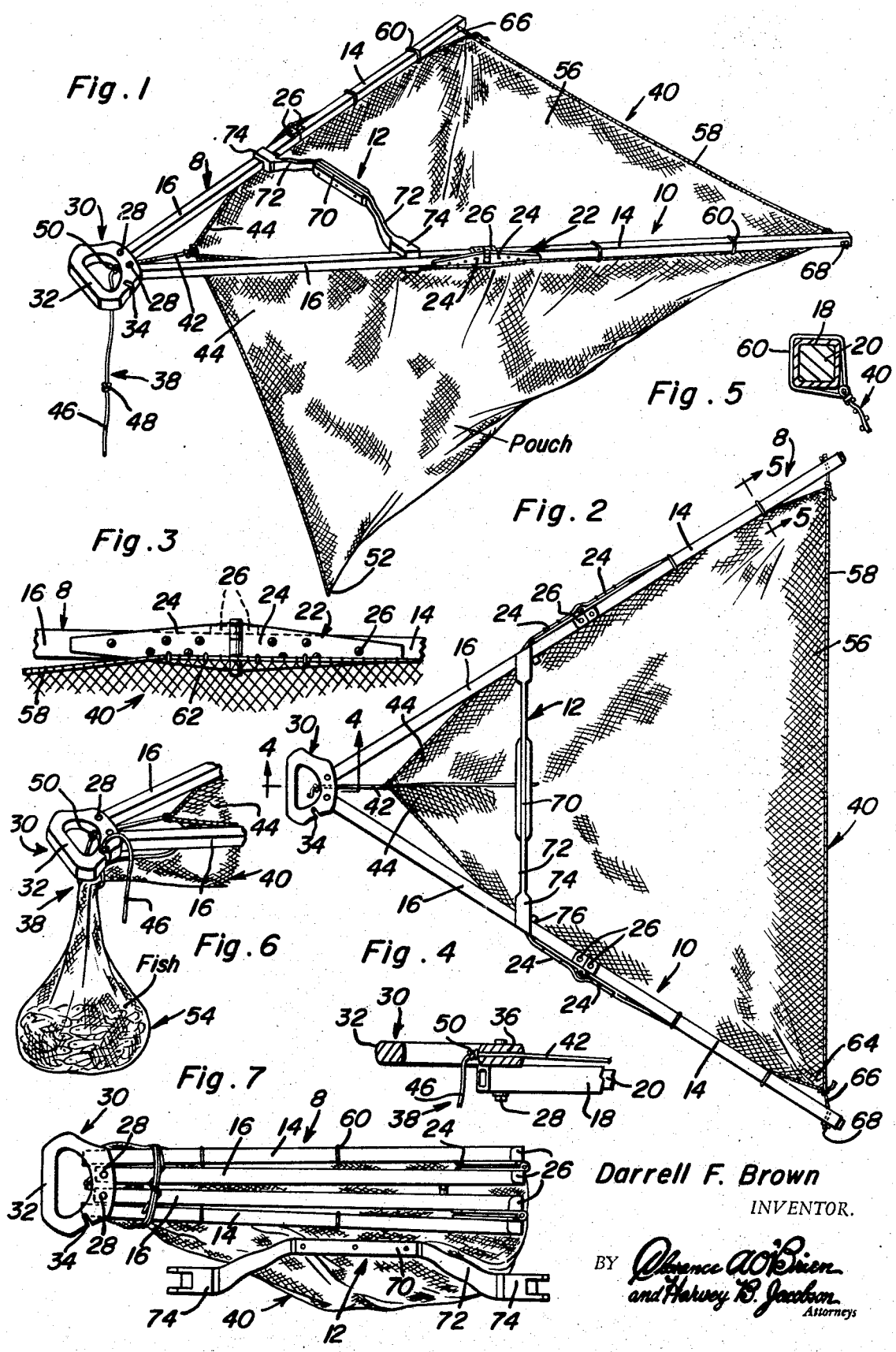

3,521,392
DIP NET FOR SURF FISHING
Darrell F. Brown, Redway, Calif.
(797 Redwood Highway, Garberville, Calif. 95440)
Filed Nov. 19, 1968, Ser. No. 776,956
Int. Cl. A01k 77/00
U.S. Cl. 43—12                                  6 Claims

ABSTRACT OF THE DISCLOSURE

A manually maneuverable surf net has a knockdown A-frame supporting a gatherable pouch-type net. The converging ends of the legs of the A-frame are hingedly joined to a handgrip for the user's right hand. The brace between the legs provides a handgrip for the left hand. A net tensioning cord is used to temporarily bag the fish.

---

The present invention relates to certain new and useful improvements in a surf net which lends itself to acceptable, convenient and ready use by amateur anglers and sportsmen as well as by commercial surf fishermen, is feasible for day or night fishing and pertains to a strong and durable balanced net which enables the user to dip the same into the water, scoop up and bag the catch in a novel easy-to-handle manner.

An object of the invention is to structurally, functionally and in other practical ways improve upon prior art nets such as, for example, the handle-equipped collapsible fishing net in the patent to Baloun, 2,536,251, and the substantially A-shaped scooping surf net shown in the patent to Butler, 2,780,020.

More specifically, the surf net herein disclosed is an innovation in that it is well balanced for ease of use and handling, is amply large to minimize undue bending of the body and, provided with unique handling means which reduces fatigue common to surf fishing particularly by uninitiated and inexperienced weekend anglers.

Briefly, the surf net herein comprehended is characterized by two primary component parts, namely, a portable knockdown A-frame and a replaceable but securely attached deep pouch strong nylon or equivalent net. The A-frame embodies a pair of rearwardly converging legs which while capable of being of one piece construction are preferably made up of hinged folding sections. These legs are spread apart and held in their forwardly diverging relationship by a cross brace having forked heads at the ends which are detachably connected to median portions of the respective left and right legs. The intermediate portion of the brace is provided with a handle for the user's left hand. The converging ends of the sectional legs are pivotally attached to a coacting portion of an appropriately shaped handgrip. This handgrip is grasped and held and manipulated with the user's right hand. A tension take-up or slack-adjusting cord or element is connected to a corner portion of the net just in front of the right hand handgrip and passes slidingly through a guide hole provided in the handgrip and the rearward free end portion is used as a tie for the apical portion of the triangulate net whereby to permit this portion to be employed as a catch holding bag for the caught fish.

One of the features of the invention is that by hingedly attaching the converging ends to the handgrip the legs are not only foldable but are collapsible whereby to thus provide a compact and convenient package which can be carried and converted into a convenient relatively small package capable of storage and also capable of being carried in the back portion of one's automobile when driving to and returning from the water which is to be fished.

Another object of the invention is to provide an adaptation wherein the legs can, if desired, be made in the form of tubular aluminum sections having wooden or equivalent reinforcing cores therein. Then, too, novelty is predicated on hinging the abutting ends of the respective leg sections together and providing stress and strain distributing blocks or lugs on the hinge leaves to assure stability when the device is being used.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a dip-type surf net with the cooperating or component parts readied for handling and use by the angler or other user.

FIG. 2 is a top plan view of the same.

FIG. 3 is an enlarged fragmentary detail section emphasizing the hinge means embodied in each leg of the aforementioned frame.

FIG. 4 is an enlarged detail section with parts in elevation taken approximately on the plane of the line 4—4 of FIG. 2 looking in the direction of the arrows.

FIG. 5 is an enlarged cross-section on the section line 5—5 of FIG. 2.

FIG. 6 is a view in perspective showing the rearward or inward end portion of the frame and showing with particularity how the net tensioning line is used not only for tensioning the net but as a loop or noose around the neck portion of the temporary fish holding bag formed from the conical bottom portion of the triangulate net.

And FIG. 7 is a plan view showing how the parts cooperate when folded for storage, carrying and handling.

The three-part manually usable portable frame is preferably in the form of an A-frame and under the circumstances is characterized, generally stated, by a pair of duplicate coplanar openable and closable as well as foldable legs, the one toward the left in FIG. 1 being denoted by the numeral 8 and the duplicate one toward the right by the numeral 10. The third part comprises the aforementioned cross brace which is denoted by the numeral 12 and which is readily applicable and removable. It is within the purview of the invention that the legs could be of one piece construction. On the other hand it is preferred that these legs, as shown, are of folding construction. Accordingly, the diverging end portions or sections are denoted in each instance by the numeral 14 and the rearward or inward sections or end portions are denoted at 16. More specifically each section, preferably but not necessarily, comprises an outer aluminum or equivalent tube which is conveniently denoted by the numeral 18 in FIG. 5 and which has a reinforcing wooden or a suitably equivalent, core as at 20. The adjacent or contiguous ends of the respective sections 14 and 16 are foldingly joined together by dual leaf or butt hinges one of which is denoted by the numeral 22 in FIG. 3. The leaves of the hinge 22 are conveniently denoted by the numeral 24 and are alike and suitably superimposed upon and fastened at 26 to the leg sections 14 and 16 (FIG. 3). It should be noted in this connection that these leaves are provided with lateral upper and lower cooperating limit stop lugs or abutments 26 which abut each other when the sections are in leg forming alignment as shown in FIGS. 1 and 2. The rearward (or inward) converging ends of the respective legs are hingedly connected as at 28 to a cooperating component part of an optionally D-shaped, or an equivalent, handgrip 30 which in practice is grasped by the user's right hand. The grip proper is denoted at 32. One marginal edge portion of this grip is provided with a kerf which provides a keeper notch 34 which serves in a manner to be described. As shown in FIG. 4 that portion of the handgrip between the converging pivoted or hinged ends 28 is provided with a bore which extends therethrough and provides a passage 36 for a portion of a slack take-up and tensioning cord or triangulate pouch type dip net 40. Continuing with the description of the element 38 it will be seen that the forward end portion 42 is suitably attached to the corner portion defined by the walls 44 of the net. The median portion of the cord is slidable back and forth through the passage and the free rearward end portion 46 is provided inwardly of the terminal end with a knot 48 which is releasably seatable in the kerf or notch 34 when used in the manner illustrated in FIG. 1. There is also a similar knot 50 which provides a limit stop when engaged with the handgrip in the manner shown in FIG. 1. As already suggested the net is primarily used as a scoop and pouch when it is dipped into the water to land fish. When a number of fish have been caught in the apical or bottom portion 52 this part of the net can then be caught hold of and swung from left to right (FIG. 6) to form a sort of a holder or bag which is conveniently designated by the numeral 54 in FIG. 6. When the bag is thus formed the coacting portion of the tension line 38 is looped similar to a noose (partly so) around the neck of the bag. In this manner the fish which have been caught can be conveniently trapped and retained in the bag for ultimate and suitable emptying and disposition. The use of this bagging feature and function depends largely on the desires of the user. This is to say the user may simply desire to trap the fish in the main net and dump the same after each scooping step has been completed; or the user may desire to utilize the bagging feature and tying of the bag in the manner shown in FIG. 6.

As to the net, it is made up of the several walls already described, that is the side walls 44 and also a so-called front wall 56. The mouth of the net is provided with a reinforcing and edging cord or equivalent flexible element 58 which is fastened by loops as at 60 in FIG. 5 to the respective arms or legs. It is also fastened as at 62 to the hinge leaves 24 as shown in FIG. 3. Then, too, the forward corner portions 64 can be tied by knotted cords 66 that is, cords which are passed through a hole in the arm and then formed into a retaining knot as at 68 in FIG. 2.

It is preferred that the attachable and detachable cross brace 12 be made of laminated wood and it includes an elevated handgrip 70 for the left hand of the user which is centrally arranged and has shank portions 72 suitably offset and twisted and provided with fork-like heads 74 which are removably fitted over median portions of the legs and are held against slippage by fixed stops or detents 76 (FIG. 2).

The surf net shown is constructed and designed mechanically for superior functional usage and is so well balanced that it greatly reduces fatigue which is common to this method of fishing. Normally these nets are unwieldy and difficult to handle when being transported to and from the fishing ground. They are often tied to car tops and parts thereof may be stuck out of the windows. With the construction shown the structure can be folded and then collapsed and then tied as shown in FIG. 7 whereupon it is compact and convenient for storage in limited space and for ready carrying and transportation as the case may be.

By providing a forward handgrip for the left hand and a rearward handgrip for the pivoted converging ends of the A-frame, it will be seen that the frame itself is unique and lends itself to the purposes for which it has been devised and perfected. This rear handle feature is believed to be unique in the construction of a frame of a dip net.

The quick release cord 38 is an innovation in a structure of the type under consideration and it enables the user to "bag" the catch in the manner shown and described and it also facilitates, because it is near the rear handle, to enable the user to bag and then again dip and again bag the catch and ultimately conveniently dump the catch in whatever manner that may be desired. Experience has shown that aluminum tubing while desired could best be used in the construction shown by employing wooden cores for reinforcing and stabilizing purposes.

The invention well serves the purposes for which it is intended for which reason a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. A dipping and scooping fish catching device comprising, in combination, a frame, said frame being substantially A-shaped in plan and embodying a rearward handgrip, a pair of coplanar spaced apart companion legs having rearward ends hingedly joined to a component portion of said handgrip, an attachable and detachable cross-brace, said cross-brace being provided intermediate its ends with a handgrip and having end heads, each head being of forked construction, said forked heads being detachably engageable with median portions of the respective legs of the frame, said legs being made up of companion sections joined by hinges, said hinges having cooperable stabilizing lugs, a multiple wall pouch type net, the mouth portion of said net being provided with marginal reinforcing cords, means for operatively connecting the wall portions with coacting portions of said legs, said handgrip being provided between the hinged legs with a cord passage, and a cord having a forward end attached to a corner portion of the mouth of the net, having a knotted intermediate portion slidingly cooperable with said passage and having a knotted free end portion, a marginal portion of said handgrip being provided with a keeper notch for said knotted free end portion.

2. For use by anglers, a manually usable surf fishing device comprising, a portable A-frame embodying a pair of coplanar legs having converging rearward ends, a cross-brace interposed between and having its outer ends operatively but detachably connected with coacting median portions of the respective legs, handle means embodying a handgrip which is adapted to be grasped and handled with one hand, a pouch-type dip net having upper marginal edges operatively attached to and suspended when in use from said legs, said converging rearward ends being hingedly and collapsibly joined to and supported by said handgrip, said handgrip being provided with a guide hole situated between the hinged ends of said converging ends, a flexible dip net tensioning element having a forward end attached to a coacting marginal mouth portion of said net, a median portion slidable through said guide hole and a free optionally usable rear end portion adapted to be looped and temporarily tied and fastened around a hand-bagged fish holding portion of said net, a marginal portion of the handgrip adjacent to said guide hole being provided with a readily accessible keeper notch into which a knotted end portion of said net tensioning element can be manually lodged and temporarily retained in a given loop-forming and bagged net holding state.

3. The surf fishing device defined in and according to claim 2, and wherein said handgrip is substantially D-shaped in plan and is expressly designed and adapted for use by the user's right hand, the median portion of said cross-brace being elevated to a plane above the plane of said legs and providing a second handgrip which is properly related to said D-shaped hand grip so that it can be caught hold of and balanced and used with the user's left-hand.

4. The surf fishing device defined in and according to claim 3 and wherein said cross-brace is provided at its respective outer ends with forked heads which are detachably engageable with medium portions of the respectively cooperable legs.

5. The surf fishing device defined in and according to claim 4 and wherein said legs are made up of complemental sections having adjacent ends hingedly connected to each other by cooperatively mounted dual leaf butt hinges, said sections being provided adjacent the hingedly connected ends of said hinge leaves with cooperating limit stop lugs which are adapted to abut each other when said sections are in leg-forming alignment.

6. For use by anglers, a manually usable surf fishing device comprising a portable A-frame embodying a pair of coplanar legs having converging rearward ends, a cross-brace interposed between and having outer ends operatively but detachably connected with median portions of the respective legs, handle means embodying a handgrip which is adapted to be grasped and handled with one hand, a pouch-type dip net having upper marginal edges operatively attached to and suspended from said legs, said converging rear ends being hingedly and collapsibly joined to and supported by said handgrip, said handgrip being substantially D-shaped in plan and rigid and designed and adapted for use when grasped and held with the user's right-hand, a median portion of said cross-brace being elevated to a plane above the plane of the respective legs and providing a balanced handgrip which is properly related to the D-shaped handgrip and legs and dip net that it can be caught hold of and balanced and used with the user's left hand, said cross-brace being provided at its respective outer ends with forked heads which are detachably engageable with median portions of the respectively cooperable legs.

References Cited

UNITED STATES PATENTS

| 1,857,826 | 5/1932 | Slamen | 43—12 |
| 2,780,020 | 2/1957 | Butler | 43—12 |

FOREIGN PATENTS

| 1,040,338 | 8/1966 | Great Britain. |

WARNER H. CAMP, Primary Examiner